United States Patent [19]

Shimizu et al.

[11] Patent Number: 4,783,289
[45] Date of Patent: Nov. 8, 1988

[54] PROCESS FOR MOLDING SILICONE RUBBER COMPOSITIONS

[75] Inventors: Koji Shimizu; Mitsuo Hamada, both of Chiba, Japan

[73] Assignee: Toray Silicone Co., Ltd., Tokyo, Japan

[21] Appl. No.: 29,520

[22] Filed: Mar. 24, 1987

[30] Foreign Application Priority Data

| Apr. 1, 1986 | [JP] | Japan | 61-74560 |
| May 26, 1986 | [JP] | Japan | 61-120766 |
| Aug. 28, 1986 | [JP] | Japan | 61-201951 |
| Aug. 29, 1986 | [JP] | Japan | 61-204066 |

[51] Int. Cl.$^4$ ............................ B29C 47/78
[52] U.S. Cl. ...................... 264/28; 264/178 F; 264/201; 264/209.6; 264/236; 264/331.11; 264/347
[58] Field of Search ............ 264/28, 209.6, 178 R, 264/178 F, 236, 347, 331.11; 425/66, 71

[56] References Cited

U.S. PATENT DOCUMENTS

| 2,820,252 | 1/1958 | Koch | 425/67 |
| 3,260,774 | 7/1966 | Harlow | 425/113 |
| 3,699,197 | 10/1972 | Egger | 425/71 |
| 3,781,400 | 12/1973 | Couchoud et al. | 264/236 |
| 4,061,704 | 12/1977 | Barter | 264/211.24 |
| 4,098,861 | 7/1978 | Bassani | 264/240 |
| 4,100,240 | 7/1978 | Bassani | 264/209.6 |
| 4,104,351 | 8/1978 | Blizzard et al. | 264/201 |
| 4,371,682 | 2/1983 | Hashimoto | 264/331.11 |
| 4,528,156 | 7/1985 | Fukuda et al. | 264/209.6 |

Primary Examiner—Jeffery Thurlow
Attorney, Agent, or Firm—Robert Spector

[57] ABSTRACT

Extruded articles such as filaments and films are fabricated by blending the components of a curable liquid silicone rubber composition at temperatures of from −60° to +5° C. and then extruding the composition into water maintained at a temperature of at least +25° C. to cure said composition. The water bath preferably contains a surfactant to facilitate processing of the extruded article. The present method provides uniformly cured articles that are almost bubble-free and have low shrinkage ratios.

10 Claims, 1 Drawing Sheet

PROCESS FOR MOLDING SILICONE RUBBER COMPOSITIONS

BACKGROUND OF THE INVENTION

1. Field of the Invention

The present invention relates to a method for fabricating cured silicone rubber articles. More specifically, the present invention relates to a method for fabricating extruded articles such as filaments and films by discharging a curable liquid silicone rubber composition into water.

2. Description of the Prior Art

Heretofore, moldings have been produced by preparing a liquid curable silicone rubber composition from its constituent ingredients at ambient or higher temperatures, and then introducing said composition into a metal mold and curing at temperatures of at least 120 degrees C. as described in Japanese Laid Open Patent Application No. 57-149354 [149,354/82] and Japanese Patent Publication No. 60-17428 [17,428/85]), or by extruding the curable composition into an atmosphere heated to a temperature of from 200 to 400 degrees C. to achieve curing.

Several problems arise in the aforesaid prior molding methods as a consequence of a fabricating process in which the liquid silicone rubber composition is prepared at room or higher temperatures and the liquid silicone rubber composition is then cured at elevated temperatures in a metal mold or in a heated atmosphere. Some of these problems are inherent in the fabrication process itself. For example, the liquid silicone rubber composition expands during curing, and the obtained molding is then difficult to release from the mold; also, when the liquid silicone rubber composition contacts the interior surface of the heated mold, it undergoes a temporary decrease in viscosity, which often results in the generation of defects in the molded article. Furthermore, bubbles are readily generated in the interior of the produced molding, and in particular it is quite difficult to produce thin moldings or delicate fibrous moldings.

One objective of the present invention is to provide a method for extruding liquid silicone rubber compositions to obtain films and thin or delicate fibrous articles exhibiting low shrinkage ratios and insignificant bubble generation.

SUMMARY OF THE INVENTION

In accordance with the present invention the problems associated with prior art methods for extruding articles such as filaments and films from liquid silicone rubber composition are eliminated by mixing the components of the curable liquid silicone rubber composition at low temperatures, and extruding the composition into water at a temperature of at least 25 degrees C. to form a shaped, cured article. A surfactant can optionally be present in the water to lower its surface tension and facilitate fabrication of the silicone rubber article.

DETAILED DESCRIPTION OF THE INVENTION

This invention provides a method for fabricating an extruded shaped article from a curable liquid silicone rubber composition, said method comprising the following sequence of steps:

I. combining and blending to homogeniety the ingredients of said composition at a temperature of from −60 to +5 degrees C., II. extruding the composition into a water bath maintained at a temperature of at least 25 degrees C. to fabricate and cure said article and III. removing the cured shaped article from the water bath.

The water bath optionally contains a surfactant to reduce the surface tension of the water and facilitate "wetting" and processing of the shaped article.

Figure 1:
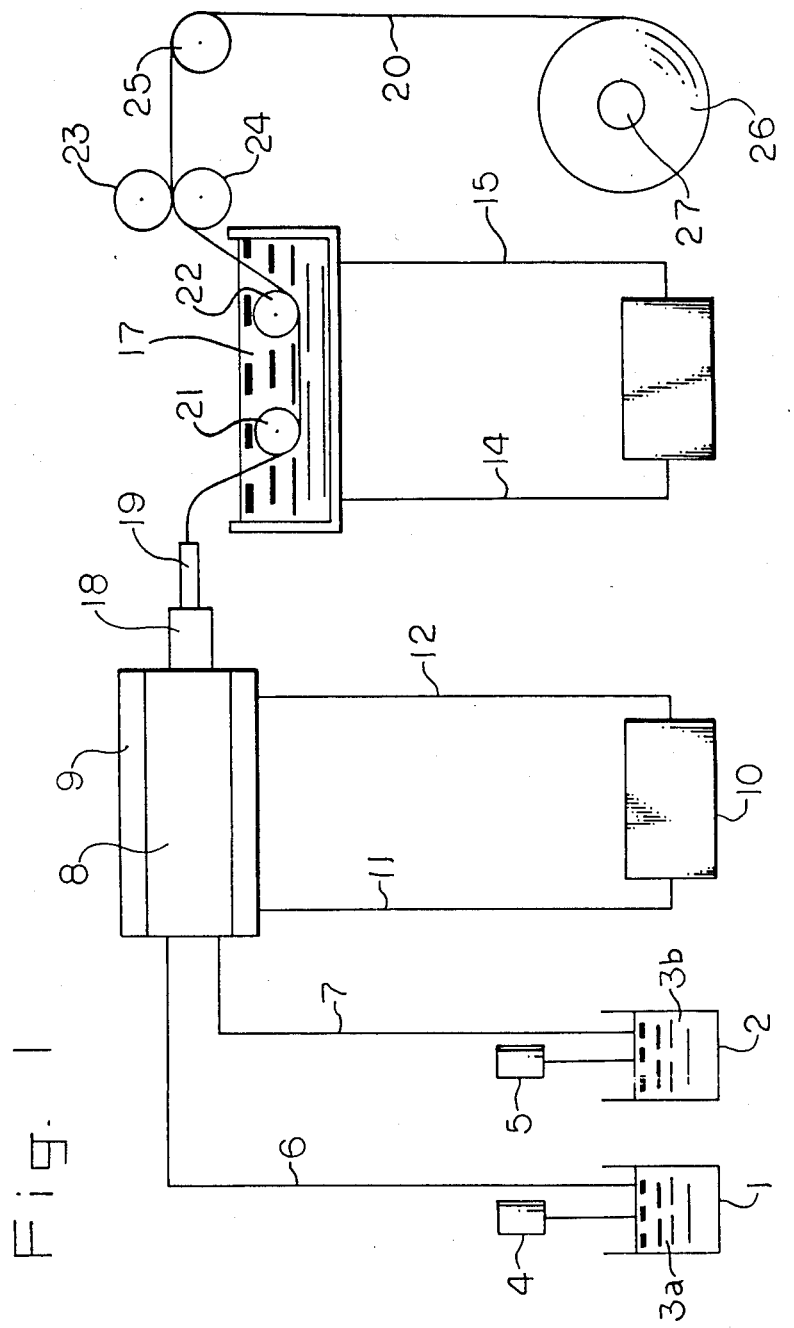
FIG. 1 is a schematic representation of the present method.

Vessels 1 and 2 each contain one of two precursors 3a and 3b, which, when combined form a curable liquid silicone rubber composition of this invention. The vessels are equipped with a metering pumps, 4 and 5, that deliver the cnntents of the vessels through conduits 6 and 7 to a screw type kneader extruder 8. The kneader extruder is equipped with a cooling jacket, 9, that maintains the material in the extruder barrel at a temperature of from −60 to +5 degrees C. The coolant is circulated by means of a pump 10 through supply lines 11 and 12. The curable composition passes from the kneader extruder into conduit 18 and is extruded through die 19 into water bath 17 that is heated to a temperature of at least 25 degrees C. by means of pressurized steam that is circulated through jacket 16 surrounding the bath by means of pump 13 and conduits 14 and 15. The silicone rubber composition is extruded through the die and the resultant shaped article 20 is supported in the water bath by rolls 21 and 22. After emerging from the bath the cured article is passed between guide rolls 23 and 24 and over winder roll 25 before being wound on a hollow core, 27.

In an alternative embodiment of the extruder 8 the face of die 19 is oriented downward toward the surface of the water bath 17.

The curable liquid silicone rubber composition used in the present invention is a liquid or paste at room temperature and comprises a liquid, reactive group-containing organopolysiloxane in addition to a crosslinker and/or curing catalyst for the organopolysiloxane. The liquid silicone rubber composition will cure to form an elastomer by standing at room temperature or by heating. Both self-supporting and non-supporting types of compositions are permissible.

The mechanisms by which liquid silicone rubber compositions cure include addition reactions between ethylenically unsaturated hydrocarbon radicals and silicon-bonded hydrogen atoms, free radical reactions initiated by organoperoxides and condensation reactions. Curing by an addition reaction type is preferred for the present compositions due to the rapid curing rate and excellent uniformity in curing.

Particularly preferred addition-reaction type liquid silicone rubber compositions are those comprising (A) an organopolysiloxane having at least 2 lower alkenyl radicals in each molecule. (B) an organopolysiloxane having at least 2 silicon-bonded hydrogen atoms in each molecule, (C) as the curing catalyst a platinum-group metal or a compound of said metal at a concentration equivalent to from 0.1 to 1,000 parts by weight of a platinum-group metal per million parts by weight of combined components (A) and (B), hereinafter designated as ppm. A requirement for the present curable liquid silicone rubber compositions is that the sum of the number of alkenyl radicals in each molecule of component (A) and the number of hydrogen atoms in each molecule of component (B) be at least 5.

Component (A) is the principal component of this embodiment of the present compositions. and it reacts with component (B) under the catalytic activity of component (C) to produce a cured silicone rubber. Component (A) must contain at least 2 lower alkenyl radicals bonded to silicon in each molecule. When less than 2 of these lower alkenyl radicals are present, a network structure cannot be formed, and a good cured product cannot be obtained.

The lower alkenyl radicals present in component (A) are exemplified by vinyl, allyl, and propenyl. The lower alkenyl radicals can be present at any position in the molecule, but they are preferably present at least at the molecular terminals. Furthermore, the molecular configuration of component (A) can be straight chain, branch-containing straight chain, cyclic, or network, but a straight chain configuration, possibly slightly branched, is preferred. The molecular weight of this component is not specifically restricted. While the viscosity may range from that of a low-viscosity liquid to a very high-viscosity gum, the viscosity at 25 degrees C. is preferably no more than 100 cP (0.1 Pa.s) in order to obtain a rubbery elastomeric cured material.

Suitable methylvinyl-containing organopolysiloxanes include but are not limited to methylvinylpolysiloxanes, methylvinylsiloxane-dimethylsiloxane copolymers, dimethylvinylsiloxy-terminated dimethylpolysiloxanes, dimethylvinylsiloxy-terminated dimethylsiloxane-methylphenylsiloxane copolymers, dimethylvinylsiloxy-terminated dimethylsiloxane-diphenylsiloxane-methylvinylsiloxane copolymers, trimethylsiloxy-terminated dimethylsiloxane-methylvinylsiloxane copolymers, trimethylsiloxy-terminated dimethylsiloxane-methylphenylsiloxane-methylvinylsiloxane copolymers, dimethylvinylsiloxy-terminated methyl(3,3,3-trifluoropropyl)polysiloxanes, dimethylvinylsiloxy-terminated dimethylsiloxane-methyl(3,3,3-trifluoropropyl)siloxane copolymers, and polysiloxanes composed of $CH_2=CH(CH_3)_2SiO_{\frac{1}{2}}$, $(CH_3)_3SiO_{\frac{1}{2}}$ and $SiO_{4/2}$ units. Combination of two or more of the aforesaid organopolysiloxanes can be used in the present invention.

Component (B) of the present preferred compositions is the crosslinker for component (A). Curing proceeds by the addition reaction of the silicon-bonded hydrogen atoms in this component with the lower alkenyl groups in component (A) under the catalytic activity of component (C). Component (B) must contain at least 2 silicon-bonded hydrogen atoms in each molecule in order to function as a crosslinker.

The sum of the number of alkenyl groups in each molecule of component (A) plus the number of silicon-bonded hydrogen atoms in each molecule of component (B) must be at least 5. It is undesirable for this sum to be less than 5 because a network structure essentially cannot then be formed, and an excellent cured article cannot be obtained.

The molecular configuration of component (B) is not specifically restricted, and it can be straight chain, branch-containing straight chain, or cyclic. While the molecular weight of this component is similarly not specifically restricted, the viscosity at 25 degrees C. is preferably from 1 to 50,000 cP (0.001 to 50 Pa.s) in order to obtain a good miscibility with component (A).

The quantity of addition of component (B) is preferably defined by the condition that the molar ratio of the total number of silicon-bonded hydrogen atoms in this component to the total quantity of all lower alkenyl radicals in component (A) is from 0.5:1 to 20:1. When this molar ratio is less than 0.5:1. a well cured composition will not be obtained. When this molar ratio exceeds about 20:1, there is a tendency for the hardness of the cured composition to increase when heated. Furthermore. if additional resinous organosiloxanes having large concentrations of alkenyl radicals are added to the present compositions for the purpose of reinforcement or other reason, it is preferred that a supplementary amount of component (B) be added to react with these additional alkenyl radicals.

Examples of this component (B) include but are not limited to trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, dimethylsiloxane-methylhydrogensiloxane cyclic copolymers, copolymers composed of $(CH_3)_2HSiO_{\frac{1}{2}}$ units and $SiO_{4/2}$ units, and copolymers composed of $(CH_3)_3SiO_{\frac{1}{2}}$ units, $(CH_3)_2HSiO_{\frac{1}{2}}$ units. and $SiO_{4/2}$ units.

Component (C) is a catalyst for the addition reaction of silicon-bonded hydrogen atoms with alkenyl radicals. Suitable catalysts include metals from the platinum group of the periodic table of the elements and compound of these metals. Concrete examples of catalysts include but are not limited to chloroplatinic acid, chloroplatinic acid dissolved in an alcohol or ketone as well as such solutions which have been ripened, chloroplatinic acid-olefin complexes, chloroplatinic acid-alkenylsiloxane complexes, chloroplatinic acid-diketone complexes, platinum black and platinum supported on a carrier.

The concentration of component (C) in the present curable compositions is typically equivalent to from 0.1 to 1,000 ppm by weight of platinum-group metal, based on the combined weight of components (A) and (B). Crosslinking will not proceed satisfactorily at below 0.1 ppm of component (C). while exceeding 1,000 weight ppm is uneconomical. Typically a concentration of from 1 to 100 ppm is preferred.

Filler can be present in the present curable liquid silicone rubber compositions to adjust the fluidity or improve the mechanical strength of the final cured article. Such fillers are exemplified by reinforcing fillers such as precipitated silica, fumed silica, calcined silica and fumed titanium dioxide, and by non-reinforcing fillers such as quartz powder, diatomaceous earth, asbestos, aluminosilicic acid, iron oxide, zinc oxide and calcium carbonate. These fillers may be used as is, or may first be treated with an organosilicon compound such as hexamethyldisilazane, trimethylchlorosilane or a hydroxyl terminated dimethylpolysiloxane.

The present compositions that are curable by a platinum catalyzed addition reaction can also contain other additives including but not limited to pigments, heat stabilizers, flame retardants, plasticizers and organopolysiloxanes having 1 alkenyl radical per molecule, the latter being for the purpose of reducing the modulus of the final cured article.

A small or very small amount of a curing reaction-retarding additive such as an acetylenic compound, a hydrazine, a triazole, a phosphine or a mercaptan can be added to the present curable compositions unless this adversely affects the objective of the invention.

A second preferred type of curable liquid silicone rubber composition cures by a free radical mechanism initiated by decomposition of an organoperoxide. These compositions comprise a vinyl-containing diorganopolysiloxane which is liquid at room temperature, and a quantity of an organoperoxide sufficient to promote curing of the composition.

Inorganic fillers, for example, fumed silica or precipitated silica, heat stabilizers, and pigments can be added as necessary. The organoperoxide is preferably selected from among those with decomposition temperatures in the range of from 25 to 100 degrees C.

In accordance with the present method the ingredients of the liquid silicone rubber composition are combined and blended at temperatures of from $-60$ to $+5$ degrees C., and preferably within the range of from $-30$ to 0 C. This is because the organopolysiloxanes used in the present invention tend to gel at temperatures below $-60$ degrees C., and so cannot be readily extruded. The compositions begin to cure during mixing at temperatures above $+5$ degrees C. and extrusion of the composition is again difficult. Also, the resulting cured material has substantially reduced mechanical properties.

The liquid silicone rubber composition produced as described hereinabove is extruded into and cured in water having a temperature of at least $+25$ C. It is undesirable for this curing temperature to fall below 25 degrees C. because the curing rate of the liquid silicone rubber compositions used in the invention then drops, and the productivity declines accordingly.

The fabrication method of the present invention can be executed by connecting a cooling device to a known kneader extruder for liquid silicone rubber compositions. The constituent components of the curable liquid silicone rubber composition are then mixed in such an extruder and the resultant composition is then discharged into and cured in a water bath that is heated to maintain a temperature of at least $+25$ degrees C.

The water into which the curable composition is extruded can contain a surfactant to reduce the surface tension of the water and thereby improve the "wetability" of the silicone rubber composition, i.e. the conditions of contact between the water and the liquid silicone rubber composition. The presence of a surfactant facilitates processing of the curable composition and increases the rate at which shaped articles such as filaments formed from these compositions can be passed through the water bath.

Any of the nonionic and ionic surfactants and emulsifying agents known in the art are suitable. However, in the case of the use of an addition-reacting liquid silicone rubber composition, surfactants containing atoms which are known to inactivate or cause a loss of activity in platinum-group metal catalysts, for example, sulfur and phosphorus, should not be used because these elements may inhibit curing of the liquid silicone rubber composition.

Specific examples of operable surfactants include but are not limited to polyoxyethylene alkyl ethers, polyoxyethylene aryl ethers, polyoxyethylene fatty acid esters, polyoxyethylene-polyoxypropylene block copolymers, sorbitan fatty acid esters, polyoxyethylene sorbitan alkylates, and fatty acid soaps.

While the concentration of surfactant in the water bath is not specifically restricted, this concentration is generally from about 0.0001 to about 10 parts by weight, preferably from 0.01 to 2.0 parts by weight, of surfactant per 100 parts by weight of water. The beneficial effect of the surfactant may not be evident at concentrations below 0.001 part by weight, while exceeding 10 parts by weight is economically disadvantageous.

Utilizing the fabrication method of the present invention, thick profiles such as rods and sheets in addition to thin articles such as films, and delicate filamentary articles can be efficiently produced.

Examples

The following examples describe preferred embodiments of the present compositions and method and should not be interpreted as limiting the scope of the accompanying claims. All parts and percentages in the examples are by weight unless otherwise indicated, and all viscosities were measured at 25 degrees C.

EXAMPLE 1

Two parts of a trimethylsiloxy-terminated methylhydrogenpolysiloxane with a viscosity of 10 cP (0.01 Pa.s) and an SiH content of 1 wt % and 30 parts dry-method silica with a specific surface area of 200 $m^2/g$ were added and blended into 100 parts of a dimethylvinylsiloxy-terminated dimethylpolysiloxane with a viscosity of 2,000 cP (2 Pa.s) and a vinyl content of 0.25 wt % to yield a mixture (mixture A) with a viscosity of 5,000 P (500 Pa.s at a shear rate of 10 $sec^{-1}$.

Thirty parts dry-method silica of the same type as described above and 0.1 part of an isopropanol solution of chloroplatinic acid solution containing 3% platinum were added and mixed into 100 parts dimethylpolysiloxane of the same type as described above to yield a mixture (mixture B) similar to that described for mixture A.

Referring to the accompanying FIG. 1, mixture A was placed in liquid silicone rubber composition precursor tank 1 and mixture B was placed in liquid silicone rubber composition precursor tank 2. These two mixtures were then fed into screw-type kneader extruder 8, which had been cooled to $-5$ degrees C. in advance by means of coolant circulator 10, using metering pumps 4 and 5 to combine the two mixtures in a 1:1 ratio.

The resulting mixture was shaped and cured by continuous extrusion from die 19 (0.3 mm outlet diameter) at a linear velocity of 3 m/minute into water at a temperature of 60 degrees C. residing in hot-water tank 17. The resultant cured filament 20 was collected on winder roll 26 using support rolls 21 and 22 and guide rolls 23, 24 and 25. The filament floated to the surface of the water between the die and the support rolls, and the yield of cured filament was 90%. The physical properties of this filament were: tensile breaking stress=42 $kg/cm^2$ and the tensile elongation at break=60%. No bubbles are found in the cross section obtained by cutting the filament with a knife.

A second portion of this curable composition was continuously extruded using the same die at a linear velocity of 3 m/minute into hot-water bath 17 containing a mixture of 100 parts water and 1 part surfactant (Tergitol(R) TMN 6. ethylene oxide adduct of trimethylnonanol, a nonionic surfactant from Union Carbide Corporation). The bath temperature was maintained at 60 degrees C. The cured filament was continuously wound up on winder roll 26 using support rolls 21 and 22 and guide rolls 23, 24 and 25 to obtain a 2,000 meter-long filament 20. In this instance the filament did not float to the surface as it passed between the die and the support rolls. The yield of the obtained uniform filament was 98%, a substantial improvement over the value obtained when the same curable composition was extruded into water that did not contain the surfactant. The time required for the filament to move beneath the support rolls and be guided to the guide rolls was substantially reduced when the surfactant was present in the water bath. The physical properties of the filament were tensile breaking stress=42 kg/cm$^2$ and tensile elongation at break=60%.

For comparison, a curable composition produced as above was extruded into water without surfactant that was maintained at a temperature of 5 degrees C. The organopolysiloxane composition was inadequately cured, and a continuous filament could not be obtained.

Also, a curable composition produced as above was extruded into water without any surfactant. The water was maintained at 60 degrees C., however the temperature within the barrel of the screw-type kneader extruder 8 was room temperature (20 degrees C.) due to the suspension of coolant circulation through its jacket 9. The extrusion from the die was nonuniform, and a uniform cured filament could not be obtained. The filament surface was also quite irregular and microfine bubbles were observed in the cross section obtained by cutting this filament with a knife.

EXAMPLE 2

This example describes fabrication of a film from a curable composition of this invention.

A curable composition of this invention was prepared by adding 1.5 parts of a trimethylsiloxy-terminated methylhydrogenpolysiloxane with a viscosity of 12 cSt (0.012 Pa.s) and an SiH content of 0.9 wt % and 40 parts dry-method silica with a specific surface area of 200 m$^2$/g to 100 parts of a dimethylvinylsiloxy-terminated dimethylpolysiloxane with a viscosity of 10,000 cP (10 Pa.s) and a vinyl content of 0.15 wt %. After blending to homogeneity, the resultant mixture (mixture C) had a viscosity of 10,000 P (1000 Pa.s) at a shear rate of 10 sec$^{-1}$. A similar mixture (mixture D) was obtained by adding and mixing 20 parts of the same type of dry-method silica as above and 0.1 part of the isopropanol solution of chloroplatinic acid described in example 1 into 100 parts of the same dimethylpolysiloxane as described for mixture C.

The two mixtures were pumped into a kneader extruder in a 1:1 volume ratio as described in example 1, with the exception that the barrel of the extruder was cooled to a temperature of −20 degrees C. in advance by coolant circulator 10. The resulting mixture was continuously extruded through die 19, a film-forming die having outlet dimensions of 0.2 mm×10 mm, at a linear velocity of 6 m/minute into water heated to a temperature of 40 degrees residing in hot-water bath 17. A 0.15 mm-thick transparent film with a lustrous surface was obtained. The physical properties of this film were: tensile strength=60 kg/cm$^2$ and tensile elongation at break=600%. Bubbles could not be found at its surface or in its interior.

EXAMPLE 3

This example describes fabrication of a hollow filament.

A curable composition of this invention was obtained by adding one part of trimethylsiloxy-terminated methylhydrogenpolysiloxane having a viscosity of 10 cP (0.01 Pa.s) and an SiH content of 1 wt % and 25 parts dry-method silica having a specific surface area of 300 m$^2$/g to 100 parts of a dimethylvinylsiloxy-terminated dimethylpolysiloxane having a viscosity of 1000 cP and a vinyl group content of 0.12 wt %. These ingredients were blended to homogeniety to yield a mixture (mixture E) having a viscosity of 12,000 Poise at a shear rate of 10 sec$^{-1}$.

0.1 Part of the isopropanolic chloroplatinic acid solution described in Example 1 and 30 parts of the same type of dry-method silica as described in the first part of the present example were added and mixed into 100 parts of the same type of dimethylpolysiloxane used in mixture E to yield a mixture (mixture F) similar to mixture E.

Mixture A was placed in liquid silicone rubber composition precursor tank 1, and mixture F is likewise placed in liquid silicone rubber composition precursor tank 2. These are then fed via metering pumps 4 and 5 into screw-type kneader extruder 8, which has been cooled in advance to −5 degrees C. by means of coolant circulator 10. Mixrures E and F were blended in a volume ratio of 1:1.

This mixture was continuously extruded into and cured in hot water bath maintained at a temperature of 60 degrees C. through tube-molding die 19. The outside diameter of the discharge opening was 3.0 mm, and the inside diameter (nipple diameter) was 2.0 mm. The cured product was wound up on winder roll 26 at a linear velocity of 30 m/minute using support rolls 21 and 22 and guide rolls 23, 24 and 25 to yield a 1000 m-long hollow filament 20. The physical properties of this filament were as follows: the tensile breaking stress=100 kg/cm$^2$, tensile elongation=700%, the outside diameter=1.0 mm and the thickness=0.25 mm. No bubbles were found in the cross section obtained by cutting this hollow filament with knife.

That which is claimed is:

1. A method for fabricating an extruded shaped article from a curable liquid silicone rubber composition, said method comprising the following sequence of steps:
   I. combining and blending to homogeniety the ingredients of said composition at a temperature of from −60 to +5 degrees C.,
   II. extruding the composition into a water bath maintained at a temperature of at least 25 degrees C., to fabricate and cure said article and
   III. removing the cured shaped article from the water bath.

2. A method according to claim 1 where said composition cures by either (1) a platinum catalyzed addition reaction between an organopolysiloxane containing at least two lower alkenyl radicals and an organohydrogenpolysiloxane containing at least two silicon bonded hydrogen atoms per molecule or (2) a free radical initiated polymerization of an organopolysiloxane containing at least two vinyl radicals per molecule conducted in the presence of an organic peroxide.

3. A method according to claim 2 where said composition cures by said platinum catalyzed addition reaction. the molar ratio of the total number of silicon-bonded hydrogen atoms to the total number of lower alkenyl radicals is from 0.5:1 to 20:1, respectively, the sum of the number of silicon bonded hydrogen atoms present per molecule of said organohydrogenpolysiloxane and the number of silicon bonded lower alkenyl radicals present per molecule of said organopolysiloxane is at least 5, said organopolysiloxane is a dimethylvinylsiloxy terminated dimethylpolysiloxane and said organohydrogenpolysiloxane is a copolymer containing dimethylsiloxane units and methylhydrogensiloxane units.

4. A method according to claim 1 where the temperature of said water bath is from −30 to 0 degrees C.

5. A method according to claim 4 where said article is in the form of a filament or a film.

6. A method according to claim 5 where said filament is hollow.

7. A method according to claim 1 where said water bath contains an ionic or non-ionic type of surfactant at a concentration of from 0.0001 to 10 parts by weight per 100 parts by weight of water.

8. A method according to claim 7 where the concentration of surfactant is from 0.01 to 2.0 parts by weight per 100 parts by weight of water and the surfactant is an ether of a polyethylene oxide.

9. A method according to claim 1 where said composition contains a filler.

10. A method according to claim 9 where said filler is silica.

* * * * *